United States Patent
Barltrop

[11] 3,708,735
[45] Jan. 2, 1973

[54] AIRCRAFT FLIGHT CONTROL SYSTEMS

[75] Inventor: Richard Kenneth Barltrop, Lewisham, London, England

[73] Assignee: Elliott Brothers (London) Limited, London, England

[22] Filed: Sept. 3, 1970

[21] Appl. No.: 69,207

[30] Foreign Application Priority Data

Sept. 3, 1969 Great Britain.....................43,587/69

[52] U.S. Cl. .....................318/564, 244/77, 250/209
[51] Int. Cl. ..............................................G05b 9/02
[58] Field of Search ..........318/564; 250/209; 244/77

[56] References Cited

UNITED STATES PATENTS 3,054,039  9/1962  Meredith..............................318/564
3,513,257  5/1970  Hobrough..........................250/209
3,454,852  7/1969  Bourne et al.........................318/564

Primary Examiner—T. E. Lynch
Attorney—Misegades and Douglas, Keith Misegades and George R. Douglas, Jr.

[57] ABSTRACT

In a signal transmission system for use, for example, in an automatic flight control system for an aircraft, signals from air data sensors and other sensing devices are fed over individual transmission lanes to signal consolidation devices such as voters, each of which develops an output signal which is dependent upon the signals on all of the lanes. To avoid feeding to all of the other lanes any spurious signals which may appear on any lane, each voter is connected directly only to its corresponding lane, and is coupled to each of the other lanes through a unidirectional radiation transmission system.

9 Claims, 3 Drawing Figures

AIRCRAFT FLIGHT CONTROL SYSTEMS

This invention relates to automatic flight control systems for aircraft.

To meet safety requirements in the flight control of aircraft it has become a standard practice to provide a control system which comprises nominally identical lanes receiving nominally identical signals from nominally identical sensors, e.g., air data sensors and gyros and nominally identical circuitries, e.g., filters, servos and amplifiers, associated with like sensors. The command signals developed from the sensors and their associated electrical circuitries are supplied to individual power amplification arrangements each of which may comprise an electrical amplifier and an hydraulic actuator controlled by signals from the amplifier. The outputs of the actuators are employed in controlling the position and movement of a control surface or surfaces of the aircraft. As with sensors, the amplifiers and actuators are nominally identical.

Because of tolerances in the manufacture of the sensors, their associated circuitries, and components in the lanes connected to the sensors, the command signals in the several lanes inevitably differ in magnitude and the accommodation of such difference in signal levels gives rise to severe design problems in connection with the actuators.

To avoid such problem it is known to provide in each lane a signal consolidation device which may be a device known in this art as a "voter." Each such consolidation device receives the command signal developed in the associated lane and the command signals developed in the remaining lanes also. In response the device produces a signal which is some predetermined function of the input signals. The device may for example, produce an output which is the average of the inputs, or it may as suggested be a voter which develops an output signal from that one of the signals present in the several lanes which bears a predesignated relationship to the other signals present in the lanes so that the signals derived at the outputs from the actuators are from the same lane and, hence, are substantially of identical magnitude. In the case of a three lane system the voters select the signal the magnitude of which is between the maximum and minimum signals. In the case of a four lane system the four input voters may each select the higher of the lowest pair of signals or, alternatively, the lower of the highest pair of signals. For systems involving more than four lanes analogous provisions may be made.

With the known arrangements, whilst the introduction of voters or other signal consolidation devices as aforedescribed avoids the design problems which would otherwise be involved, it has a serious disadvantage; the mere provision of electrical interconnections between the several lanes reduces the integrity of the overall system in that the failure of an electrical interconnection between two lanes is liable to give rise to spurious input signals to the voters of all of the interconnected lanes. For example, the shorting to earth of an interconnection gives rise to a spurious signal at the voter of the signal receiving lane and unless a unidirectional signal transmitting device is included in the interconnection, will also give rise to a spurious signal at the voter of the signal transmitting lane. Since the latter lane is connected to the or each remaining lane the spurious signal is transmitted to the voter of each such lane also. This may be avoided but only at the expense of further circuit complication and, incidentally, further reduction of system integrity. Buffers are of course, themselves subject to failure and whilst they serve as a protection against the transmission of spurious signals to the signal transmitter lane, due e.g., to shorting to earth of a lead, failure of the buffer itself may permit such signals to be passed to the transmitting lane and hence to the or each of the remaining lanes. As a result of any such failure not one but two and possibly more lanes are effectively removed from the system and subsequent operation of the system may be defeated or at best be dependent on the adequate functioning of any remaining lane or lanes.

According to the invention a signal transmission system includes a number of signal transmission lanes each arranged to receive electric signals from a corresponding one, respectively, of a plurality of sensing means, a corresponding number of signal consolidation devices having first inputs connected respectively to the corresponding lanes and having further inputs to receive signals from the other lanes, respectively, each said device being operative to develop from the electric signals in the lanes an output which bears a prescribed relationship to the electric signals, and unidirectional radiation transmission means coupling each said further input to the respective other lane.

The unidirectional radiation transmission means may include a plurality of first transducers respectively connected to the lanes and operative to generate said radiation in dependence upon the electric signals in the respective lanes, a corresponding plurality of second transducers operative to convert said radiation to electric signals for application to said further inputs, and radiation conduction means between said first and second transducers.

The first transducers may employ gallium arsenide in the conversion of electrical signals into radiation; the second transducers may comprise photo-diodes or photo-transistors. Other devices exhibiting similar characteristics may, of course, be employed.

Preferably the radiation transmission means comprises a plurality of fiber optical conductors.

Such an arrangement is demonstrably safe; due to the nature of the signalling employed between lanes, the lanes are isolated as effectively as if no cross-connections existed between lanes.

An embodiment of the invention is hereinafter described with reference to the accompanying drawings in which.

Figure 1:
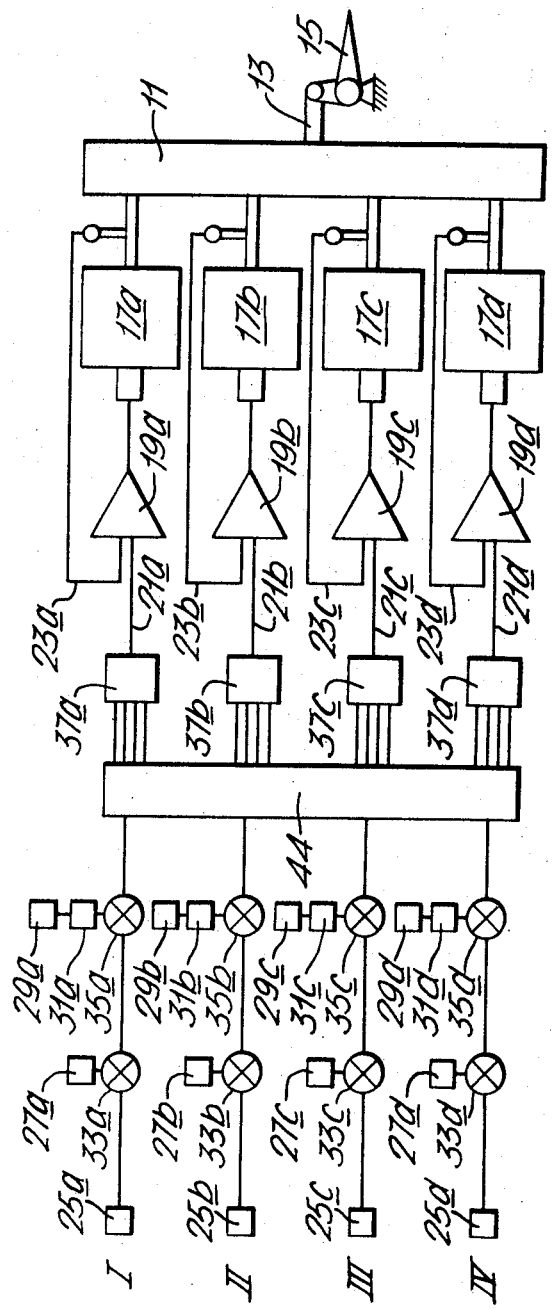
FIG. 1 is a schematic diagram showing, in a simplified form, the pitch control channel of an automatic flight control system.

The pitch control channel may, as shown, have four individual lanes I to IV, which are connected to a consolidation device 11, the common output 13 of which is employed to operate the aircraft elevator or elevators, as 15.

Each lane includes an actuator, 17a to 17d, and an amplifier, 19a to 19d. The amplifiers 19a to 19d receive on one input 21a to 21d command signals developed in their respective channels and on other inputs, as 23a to 23d, feedback signals, e.g., position feedback signals, from the outputs of respective ones of the actuators 17a to 17d, necessary in the control of the elevator movement and position.

The command signals in the four lanes are developed by sensors, such as air data sensors, 25a to 25d, attitude gyros, as 27a to 27d, and rate gyros, as 29a to 29d. These signals filtered, as at 31a to 31d, if need be, are summed at summing points, as 33a to 33d and 35a to 35d.

Each lane includes a four-input voter, 37a to 37d, the four inputs of each voter (FIG. 2) being respectively connected to the four lanes.

The voters 37a to 37d are each operative to develop an output signal from that one of the signals present in the four lanes which bears a prescribed relationship to the signals present in the other lanes so that the signals supplied to the consolidation device 11 from the individual actuators 17a to 17d are derived from the same lane.

Figure 3:
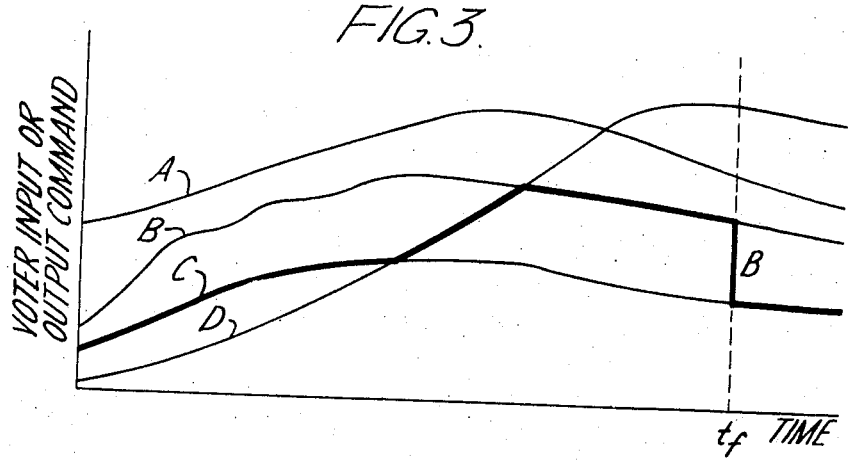
FIG. 3 is a graph showing the operating characteristic of a voter.

With a four input voter it might be expedient to select that signal of amplitude next to the lowest amplitude signal. The output characteristic of the voter might then be as shown in FIG. 3. In the latter figure the input signals A, B, C and D are shown plotted against time. It will be seen that the output signal follows the input characteristic C up to the point of intersection between characteristics C and D, from the latter point to the point at which the characteristics D and B intersect the output characteristic follows the input D and from the latter intersection the input B. If at time $t_f$ a fault develops in lane B in such a sense that the value of the signal B decreases the voter follows the signal B to the intersection of characteristics B and C thereafter follows characteristic C. A runaway in a signal in the opposite sense results in a similar capture by the voter of a signal which conforms to the prescribed rule regarding selection of signals.

It will be readily seen that it is the same signal which is selected by the four-input voters for application to the amplifiers 19a to 19d and, hence, the consolidation device 11.

By employing voting arrangements, as discussed, problems associated with null and other differences in the characteristics of the sensors, and circuitries associated therewith, are avoided. If, for example, the control system is to control the aircraft in an altitude hold, or height lock, mode, the air data sensors 25a to 25d inevitably develop output signals of differing amplitudes, representing different altitudes, as a result of manufacturing tolerances. If the lanes are completely independent in the sense that there are no cross-connections between lanes, the actuators 17a to 17d develop differing outputs and the accommodation of these differing commands poses severe design problems so far as the actuators 17a to 17d, or the consolidation device 11, or both actuators and consolidation device, are concerned.

The use of voters and electrical cross-connections between lanes avoids such design problems but the presence of such cross-connections inevitably affects the system integrity. Where the transmission of electrical signals from one lane to another is employed, the earthing of a signal conductor to a voter gives rise to a spurious input to the voter and, unless a buffer is included in the signal path, also to the voter of the signal transmitting lane. Even where buffers are provided there is always the possibility of a failure in the buffer which, occurring, may affect the transmission of the signal or, in the presence of e.g., an earth on the conductor allow a spurious signal to appear at the voter of two interconnected lanes. In such circumstances the two lanes so interconnected are effectively lost and, unless provision is made to prevent the earthing of the remaining voters, these are effectively lost also and the entire control system is rendered ineffective.

Figure 2:
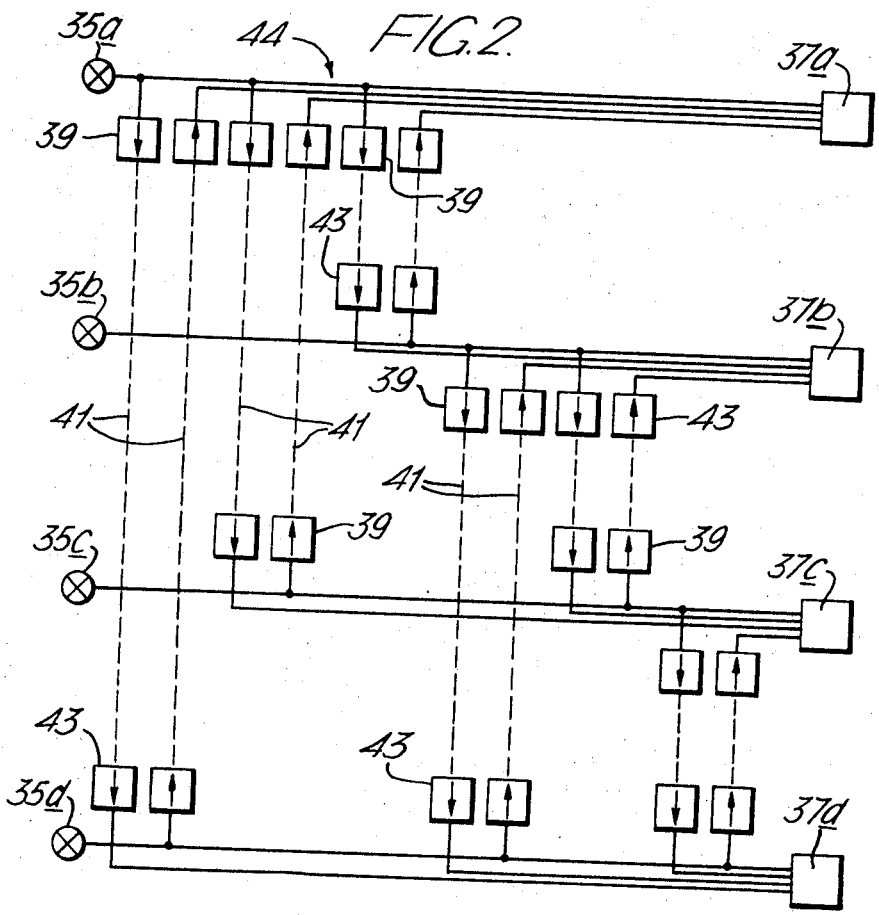
FIG. 2 is a schematic diagram of part of the system of FIG. 1.

To overcome the dangers attendent on multiple lane systems including voters cross-connected as described, the systems according to the invention have the voters 37a to 37d cross-connected by communication channels, as shown in FIG. 2, each of which comprises a first transducer 39 operative to convert electrical signals present in a lane into electromagnetic radiation in a certain waveband, a radiation conduction member 41 transmissive to radiation developed by the transducer 39, and a second transducer 43 which converts the transmitted radiation into electrical signals and supplies the latter signals to the relevant input of a voter e.g., 37b in another lane.

Where the radiation transmissive member 41 is to be transmissive as regards radiation in the visible segment of the electromagnetic spectrum the first transducer 39 must of course be operative to convert electrical signals into corresponding light signals. This might of course be accomplished by a lamp; the lag and unreliability inherent in such transducers may, however, make their use undesirable.

Another transducer 39 which may be employed relies on the irreversible conversion property of gallium arsenide.

Gallium arsenide, in response to an electrical stimulus, emits electromagnetic radiation in the infra-red portion of the spectrum. Accordingly, where this substance is employed, the radiation transmissive member 41 must be transmissive to infra-red radiation. Another suitable substance for the first transducer is gallium arsenide phosphide. This develops radiation in the visible portion of the spectrum. Although the radiation transmissive member may be of any suitable construction it is preferred to employ a fiber optical device. The radiation transmissive properties of glass fibers accommodate radiation over the visible and infra-red portions of the spectrum and thus glass fibers may be associated with both gallium arsenide and its phosphide. On the other hand for cost reasons it might be desired to employ radiation transmissive plastic fibers. At the present time at least such fibers are substantially non-transmissive to radiation in the infra-red region; the characteristic of gallium arsenide phosphide is, however, such that it can be employed in conjunction with such fibers.

As regards the second transducer 43, this could be constituted by a silicon photo-transistor or silicon photo-diode. Preferably, is the case as with photo-transistors or photo-diodes, the transducer 43 should be irreversible in operation; but provided the first transducer 39 is irreversible this is not absolutely essential.

By virtue of the irreversible characteristic of the first transducer 39 there can be no possibility of the transmission of spurious signals to more than one control lane; this can be readily demonstrated and, in distinction from prior arrangements and proposals, does not entail an expensive, in distinction from prior arrangements and proposals, does not entail an expensive, prolonged and complex fault analysis for its demonstration.

I claim

1. A signal transmission system, including a number of signal transmission lanes each arranged to receive electric signals from a corresponding one, respectively, of a plurality of sensing means, a corresponding number of signal consolidation devices having first inputs connected respectively to the corresponding lanes and having further inputs to receive signals from the other lanes, respectively, each said device being operative to develop from the electric signals in the lanes an output which bears a prescribed relationship to the electric signals, unidirectional radiation transmission means coupling each said further input to the respective other lane, the unidirectional radiation transmission means including a plurality of first transducers respectively connected to the lanes and operative to generate said radiation in dependence upon the electric signals in the respective lanes, a corresponding plurality of second transducers operative to convert said radiation to electric signals for application to said further inputs, and radiation conduction means between said first and second transducers.

2. A system as claimed in claim 1, in which said first transducers are operative to convert said electric signals into electromagnetic radiation but cannot effect the reverse conversion.

3. A system as claimed in claim 2, in which said first transducers are gallium arsenide devices.

4. A system as claimed in claim 2, in which said first transducers are gallium arsenide phosphide devices.

5. A system as claimed in claim 1, in which said radiation conduction means comprises a plurality of fiber optical conductors.

6. A system as claimed in claim 1, in which said sensing means are arranged to sense operating conditions of an aircraft.

7. A system as claimed in claim 6, in which said outputs from the signal consolidation devices are arranged to control the operation of elevating means for the aircraft.

8. A system as claimed in claim 1, in which the signal consolidation devices are voters.

9. A system as claimed in claim 8, in which the output from each voter is dependent, at all instants, upon that electric signal which has a prescribed relationship to the electric signals in the other lanes.

* * * * *